United States Patent [19]

Atarashiya

[11] Patent Number: 4,948,567
[45] Date of Patent: Aug. 14, 1990

[54] DEODORIZER FOR REFRIGERATORS OR THE LIKE

[75] Inventor: Kousuke Atarashiya, Kameoka, Japan

[73] Assignee: Kabushiki Kaisha Toshiba, Kawasaki, Japan

[21] Appl. No.: 310,669

[22] Filed: Feb. 15, 1989

[30] Foreign Application Priority Data

Feb. 22, 1988 [JP] Japan .......................... 63-22209[U]
Feb. 24, 1988 [JP] Japan .......................... 63-23528[U]

[51] Int. Cl.$^5$ .......................... A61L 9/00; A61L 9/16
[52] U.S. Cl. .......................... 422/122; 422/5; 422/4; 422/120; 62/78
[58] Field of Search .......................... 422/1, 40, 124–126; 62/78

[56] References Cited

U.S. PATENT DOCUMENTS

| | | | |
|---|---|---|---|
| 2,765,046 | 10/1956 | Rondholz | 422/4 X |
| 2,988,432 | 10/1957 | Long | 422/122 |
| 4,343,765 | 8/1982 | Elston et al. | 422/122 X |

FOREIGN PATENT DOCUMENTS 56-97520  8/1981  Japan .................................. 422/122
1060396  3/1967  United Kingdom .
1243352  8/1971  United Kingdom .
1473701  5/1977  United Kingdom .
2014299  8/1979  United Kingdom .

Primary Examiner—Robert J. Warden
Assistant Examiner—Jeffrey R. Snay
Attorney, Agent, or Firm—Foley & Lardner, Schwartz, Jeffery, Schwaab, Mack, Blumenthal & Evans

[57] ABSTRACT

A deodorizer for refrigerators or the like includes a deodorizing element composed of an adsorbent adsorbing odor components contained in the air in a storage compartment containing foodstuffs and a catalyzer oxidizing and decomposing the odor components adsorbed by the adsorbent, and a heater energized and deenergized for applying heat to the deodorizing element. The odor components contained in the air in the storage compartment are adsorbed by the adsorbent of the deodorizing element during the heater deenergization period. When the heater is energized to apply heat to the deodorizing element, the odor components adsorbed by the adsorbent are drawn out from the adsorbent and brought into contact with the catalyzer. The odor components are oxidized and decomposed by the catalyzer.

2 Claims, 3 Drawing Sheets

DEODORIZER FOR REFRIGERATORS OR THE LIKE

BACKGROUND OF THE INVENTION

1. Field of the Invention

This invention relates to a deodorizer for refrigerators or the like which is provided for removing odor components from air in the storage compartments of the refrigerator.

2. Description of the Prior Art

Generally, the refrigerators have a problem that when one or more foodstuffs stored in the storage compartment stink, the storage compartments are filled with foul odor or smell, or the mixture of some kind of such odor or smell, which adheres to the other foodstuffs.

In order to solve the above-mentioned problem, the prior art has provided deodorizing means. One of such deodorizing means is an adsorbent such as activated charcoal. The adsorbent is placed in the storage compartment for adsorbing the odors to remove them from the air in the storage compartment. The prior art has provided another deodorizing means comprising an ozonizer and catalyzer, wherein ozone generated by the ozonizer is reacted with the odor components contained in the air in the storage compartment, thereby oxidizing and therefore decomposing the odor components. The ozone remaining is dissolved by the catalyzer.

However, in the above-described former deodorizing means, the adsorption capacity of the adsorbent has a definite limit and accordingly, duration of the deodorizing capability of the adsorbent does not last long. On the other hand, the latter deodorizing means requires the catalyzer for decomposing the ozone harmful to the human body as well as the ozonizer, whereby the construction of the deodorizing means is complicated.

It has been contemplated that heat would be applied to the conventional adsorbent so that the adsorbent recovers its adsorbing capability. However, a duct or the like will be required to exhaust the odor components removed from the adsorbent by application of heat thereto, thereby complicating the construction of the deodorizer.

SUMMARY OF THE INVENTION

Therefore, an object of the present invention is to provide a deodorizer for refrigerators or the like wherein the duration of the deodorizing capability can be improved and wherein the construction of the deodorizer can be simplified.

The deodorizer in accordance with the present invention is provided in the refrigerator or the like including a heat-insulated cabinet in which storage compartments for storing foodstuff, and an evaporator for chilling the air in the storage compartments. The deodorizer comprises a deodorizing element comprising an adsorbent adsorbing odor components contained in the air in the storage compartments and a catalyzer oxidizing and therefore decomposing the odor component, and a heating means energized and deenergized for applying heat to the deodorizing element.

The odor components contained in the air in the storage compartments are adsorbed by the adsorbent of the deodorizing element. The heating means is then energized to thereby apply heat to the deodorizing element, whereby the odor component is removed from the adsorbent of the deodorizing element. The odor components are oxidized and decomposed by the catalyzer. Consequently, the adsorbing capability of the adsorbent may be revived by removing the odor component therefrom.

According to the deodorizer of the present invention, heat is applied to the adsorbent by the heating means, and the adsorbing capability thereof is recovered. As a result, the deodorizing element may be reiteratively used and accordingly, the deodorizing capability of the deodorizing element lasts longer than the prior art adsorbent which adsorbs the odor components but is not heated to remove the odor components therefrom.

Furthermore, since the deodorizer of the invention comprises the deodorizing element and the heating means for applying heat to the deodorizing element, the construction of the deodorizer may be simplified.

Other and further objects of the present invention will become obvious upon an understanding of the illustrative embodiment about to be described or will be indicated in the appended claims, and various advantages not referred to herein will occur to one skilled in the art upon employment of the invention in practice.

DESCRIPTION OF THE PREFERRED EMBODIMENTS

A first embodiment of this invention will now be described with reference to FIGS. 1 to 5 of the drawings.

Figure 1:
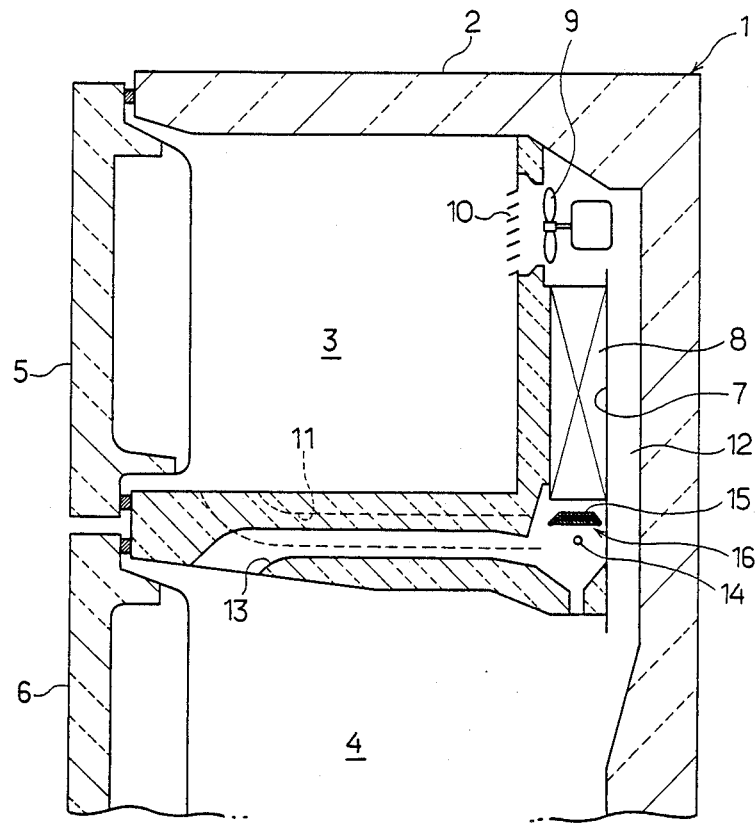
FIG. 1 is a longitudinal sectional view of the upper portion of a refrigerator to which the deodorizer of a first embodiment in accordance with the invention is applied.

Referring first to FIG. 1, a refrigerator 1 comprises a heat-insulated cabinet 2, the interior of which is divided into a freezing compartment 3 and a storage compartment 4 for storing foodstuffs. The freezing and storage compartments 3 and 4 have doors 5 and 6 for closing and opening the compartments, respectively. An evaporator compartment 7 is formed at the backside of the freezing compartment 3 and an evaporator 8 is provided in the compartment 7. The evaporator 8, a compressor (not shown) and a capacitor (not shown) constitute a refrigerating means for supplying chilled air to the freezing and storage compartments 3 and 4. A fan means 9 is provided over the evaporator 8. Upon drive of the fan means 9, part of the air chilled by the evaporator 8 is supplied to the freezing compartment 3 through an outlet 10. Air in the freezing compartment 3 is circulated to the side of the evaporator compartment 7 through a return duct 11, thereby keeping the interior of the freezing compartment 3 cool. Another part of the air chilled by the evaporator 8 is supplied to the storage compartment 4 through a supply duct 12 and the air in the storage compartment 4 is circulated to the evaporator compartment side through a return duct 13, thereby keeping the interior of the storage compartment 4 cool. The evaporator compartment 7, freezing compartment 3 and return duct 11 constitute a circulation path through which the air in the freezing compartment 3 is circulated. The evaporator compartment 7, supply duct 12, storage compartment 4 and return duct 13 constitute another circulation path through which the air in the storage compartment 4 is circulated.

Figure 2:
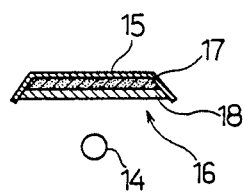
FIG. 2 is an enlarged longitudinal section of the portion of the refrigerator in which the deodorizer is provided.
Figure 3:
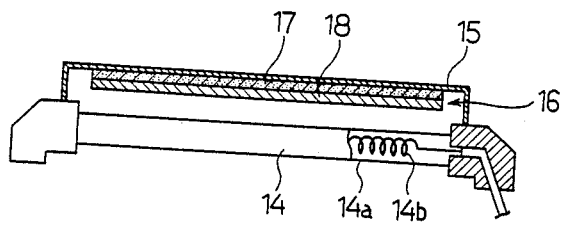
FIG. 3 is an enlarged broken front view of the portion of the refrigerator shown in FIG. 2.

A defrosting heater 14 is provided below the evaporator 8 in the evaporator compartment 7. The defrosting heater 14 is formed into a glass tube heater comprising a glass tube 14a and a heating wire 14b provided in the glass tube 14a, as shown in FIG. 3. A cover 15 is provided on the upper portion of the defrosting heater 14 for preventing it from getting wet with the defrost water during its defrosting operation, as shown in FIGS. 2 and 3. The underside of the cover 15 is opened. The defrosting heater 14 is controlled by means known in the art so that it is energized only during the defrosting operation for the evaporator 8 and so that the defrosting heater 14 is energized otherwise.

A deodorizing element 16 is provided on the inner surface of the cover 15. The deodorizing element 16 comprises a adsorbent layer 17 including an adsorbent, for example, activated charcoal, silica (silicon dioxide) or the like and a catalyzer layer 18 including a catalyzer such as platinum, nickel or the like. The deodorizing element 16 is disposed in the cover 15 so that the adsorbent layer 17 thereof is placed at the inner side of the cover 15 with the catalyzer layer 18 placed at the outer side of the cover so that the catalyzer layer 18 is nearer to the defrosting heater 14 than the adsorbent layer 17 is. In the forming of the deodorizing element 16, a generally plate-shaped adsorbent layer 17 is formed by sintering the adsorbent. One of the sides of the adsorbent layer 17 is dipped in the catalyzer solution to cause the catalyzer to adhere to the side and then treated with heat, thereby forming the catalyzer layer 18 on one of the sides of the adsorbent layer 17. Both of the adsorbent and catalyzer layers 17 and 18 are porous, that is, have many small apertures such that air flows through the apertures.

Operation of the deodorizer will now be described. The fan means 9 causes the air in the freezing compartment 3 to flow through the evaporator compartment 7, the freezing compartment 3 and the return duct 11 in the refrigerating operation period during which the defrosting heater 14 is deenergized. Also, the air in the storage compartment 4 is caused to be circulated through the evaporator compartment 7, the supply duct 12, the storage compartment 4 and the return duct 13. When the air flows in the evaporator compartment 7 in the circulation process, the air is brought into contact with the adsorbent layer 17 of the deodorizing element 16 through the catalyzer layer 18 thereof, whereby the odor components contained in the air such as methyl mercaptan ($CH_3SH$) and ammonia ($NH_3$) are adsorbed by the adsorbent of the adsorbent layer 17 to be removed from the air.

When the defrosting operation is started, the operation of the evaporator 8 and the fan means 9 is stopped and the defrosting heater 14 is energized to generate heat. The heat generated by the defrosting heater 14 is applied to the evaporator 8 so that the defrosting operation for the evaporator 8 is performed. The heat is applied not only to the evaporator 8 but also to the deodorizing element 16. Since the deodorizing element 16 is disposed so that the catalyzer layer 18 thereof is placed nearer to the defrosting heater 14 than the adsorbent layer 17 is, the temperature of the catalyzer layer 18 is first increased and then that of the adsorbent layer 17 is increased. With increase of the temperature of the adsorbent layer 17, the odor components adsorbed by the adsorbent layer 17 is removed therefrom and then oxidized to be decomposed with the catalyzer layer 18, thereby removing the odor components from the air. The adsorbent layer 17 recovers its adsorbing capability as the result of removal of the odor components therefrom.

When the refrigerating operation is restarted with completion of the defrosting operation, the temperature of the deodorizing element 16 is decreased. The odor components contained in the air in the freezing and storage compartments are adsorbed by the adsorbent layer 17 of the deodorizing element 16.

According to the above-described embodiment, the adsorbing capability of the adsorbent layer 17, namely, of the deodorizing element 16 may be recovered by application of the heat of the defrosting heater 14 to the adsorbent layer 17. Accordingly, the deodorizing capability of the deodorizing element 16 may be effectuated longer than that of the prior art deodorizer wherein the adsorbent adsorbs the odor components but does not recover its adsorbing capability. Furthermore, in the above-described embodiment of the present invention, the odor components removed from the adsorbent layer 17 by application of heat is oxidized and decomposed by the catalyzer layer 18. Accordingly, the duct or the like for exhausting the odor components is not required in the deodorizer of the embodiment described above.

Since the deodorizer of the present invention is made up of the deodorizing element 16 and the defrosting heater utilized for intermittently applying heat to the deodorizing element 16, the construction of the deodorizer may be simplified as compared with that of the conventional deodorizer wherein the ozonizer is employed for oxidizing and decomposing the odor components. Furthermore, since the defrosting heater is utilized for applying heat to the deodorizing element 16, a separate exclusive heater may not be provided.

Figure 4:
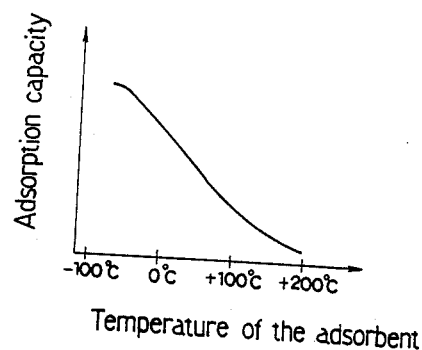
FIG. 4 is a graph representation showing the relationship between the temperature of the adsorbent and the adsorption capacity.
Figure 5:
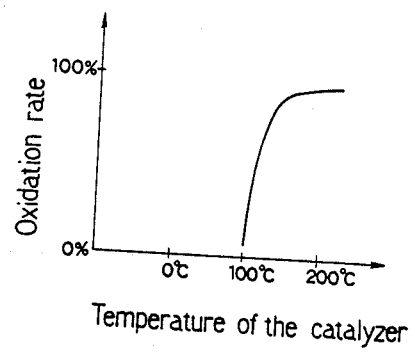
FIG. 5 is also a graph representation showing the relationship between the temperature of the catalyzer and the oxidization rate of the odor components.

Generally, the adsorbent such as activated charcoal and silica provides high-level adsorptivity when the temperature thereof is relatively low, as shown in FIG. 4. The adsorptivity of such adsorbent is reduced as the temperature thereof rises. Whereas, the catalyzer such as platinum and nickel has characteristics that it does not react with the odor components to oxidize and decompose them when the temperature thereof is relatively low and that the decomposition capability thereof is increased when the temperature thereof is raised to a predetermined value or above. Should the deodorizing element 16 be disposed so that the adsorbent layer 17 is placed nearer to the defrosting heater 14 than the catalyzer layer 18 is, the temperature of the adsorbent layer 17 is increased prior to the increase of the temperature of the catalyzer layer 18 when heat is applied by the defrosting heater 14 to the deodorizing element 16. Consequently, even when the odor components are removed from the adsorbent layer 17, the odor components are not oxidized nor decomposed by the catalyzer layer 18, thereby reducing the odor component decomposition efficiency of the deodorizer.

According to the above-described embodiment, however, the deodorizing element 16 is disposed so that the catalyzer layer 18 is placed nearer to the defrosting heater 14 than the adsorbent layer 17 is. Since this disposition of the deodorizing element 16 allows the temperature of the catalyzer layer 18 to be increased prior to that of the adsorbent layer 17 when heat is applied by the defrosting heater 14 to the deodorizing element 16, the odor components removed from the adsorbent layer 17 may be oxidized and decomposed by the catalyzer layer 18 with high efficiency. Further, the above-described construction of the deodorizer utilizes the conventional adsorbent and catalyzer.

Although the defrosting heater 14 is utilized for applying heat to the deodorizing element 14 in the foregoing embodiment, an exclusive heater may be provided so as to be preferably energized and deenergized in synchronization with the defrosting heater. Further, heaters of the heat ray penetration type such as an infrared ray heater may be employed.

Figure 6:
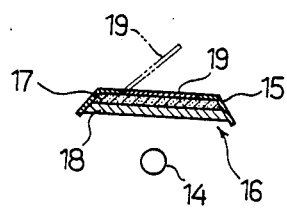
FIG. 6 is a view similar to FIG. 2 illustrating the deodorizer of a second embodiment.
Figure 7:
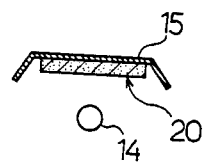
FIG. 7 is also a view similar to FIG. 2 illustrating the deodorizer of a third embodiment.

FIG. 6 illustrates the deodorizer of a second embodiment in accordance with the invention. The cover 15 is provided with an opening and shutting member 19 at the side opposed to the side facing the defrosting heater 14. The opening and shutting member 19 is opened during the refrigerating operation and shut during the defrosting operation. Consequently, air flow is made throughout the deodorizing element 16 and an amount of air contacting the adsorbent layer 17 is increased, thereby improving the odor component adsorption efficiency of the deodorizer. FIG. 7 illustrates the deodorizer of a third embodiment. The third embodiment differs from the first embodiment in that the adsorbent and catalyzer are mixed in the deodorizing element 20.

Figure 8:
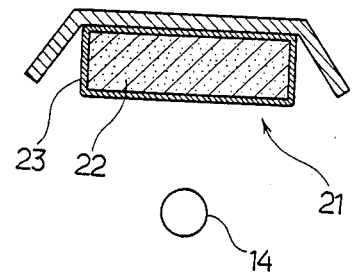
FIG. 8 is also a view similar to FIG. 2 illustrating the deodorizer of a fourth embodiment.

FIG. 8 illustrates the deodorizer of a fourth embodiment which differs from that of the first embodiment in the following. The deodorizing element 21 is formed so that the catalyzer layer 23 is provided over the entire outer surface of the adsorbent layer 22.

The foregoing disclosure and drawings are merely illustrative of the principles of the present invention and are not to be interpreted in a limiting sense. The only limitation is to be determined from the scope of the appended claims.

What I claim is:

1. In a refrigerator, including a heat-insulated cabinet for storing foodstuffs, a refrigerating means for refrigerating air in the heat-insulated cabinet, a heating means disposed adjacent to the refrigerating means for applying heat to the refrigerating means for removal of frost adherent thereto, a means for providing intermittent energizing of said heating means for a predetermined period, and a means for circulating air along a circulation path, said circulation path including a duct, said duct being in fluid communication with said heat-insulated cabinet, wherein the improvement comprises:
    a deodorizer comprising:
        (a) a deodorizing element disposed in said duct of said circulation path, said deodorizing element having an adsorbent for adsorbing odor components from said heat-insulated cabinet, and
        (b) a catalyzing layer for oxidizing said odor components adsorbed by said adsorbent, said catalyzing layer covering the deodorizing element and being integral therewith,
    wherein said deodorizer is intermittently heated by said heating means during said intermittent energizing of said heating means.

2. In a refrigerator as claimed in claim 1, wherein the improvement further comprises said catalyzing layer being arranged between the heating means and the adsorbent so that the temperature of the catalyzing layer is increased prior to that of the adsorbent during said intermittent energizing of said heating means.

* * * * *